United States Patent
Rotithor et al.

(10) Patent No.: US 6,983,356 B2
(45) Date of Patent: Jan. 3, 2006

(54) HIGH PERFORMANCE MEMORY DEVICE-STATE AWARE CHIPSET PREFETCHER

(75) Inventors: Hemant G. Rotithor, Hillsboro, OR (US); Randy B. Osborne, Beaverton, OR (US); Donald W. McCauley, Lakeway, TX (US)

(73) Assignee: Intel Corporation, Santa Clara, CA (US)

(*) Notice: Subject to any disclaimer, the term of this patent is extended or adjusted under 35 U.S.C. 154(b) by 368 days.

(21) Appl. No.: 10/325,795

(22) Filed: Dec. 19, 2002

(65) Prior Publication Data

US 2004/0123043 A1    Jun. 24, 2004

(51) Int. Cl.
    *G06F 12/00*    (2006.01)

(52) U.S. Cl. .............. 711/213; 711/204; 711/108; 711/137; 712/237; 712/238; 712/239

(58) Field of Classification Search .......... 711/213, 711/108, 137, 204; 712/237–239

See application file for complete search history.

(56) References Cited

U.S. PATENT DOCUMENTS

| | | | | |
|---|---|---|---|---|
| 4,370,710 A | * | 1/1983 | Kroft | 711/128 |
| 5,168,557 A | | 12/1992 | Shibuya | 712/207 |
| 5,367,657 A | * | 11/1994 | Khare et al. | 711/118 |
| 5,450,561 A | | 9/1995 | Ryan | 711/3 |
| 5,835,947 A | | 11/1998 | Cherabuddi | 711/125 |
| 6,507,895 B1 | * | 1/2003 | Wang et al. | 711/137 |
| 6,571,318 B1 | * | 5/2003 | Sander et al. | 711/137 |

OTHER PUBLICATIONS

Lin, et al., Reducing DRAM Latencies with an Integrated Memory Hierarchy Design, IEEE, 2001, pp. 301-312.

* cited by examiner

*Primary Examiner*—T Nguyen
(74) *Attorney, Agent, or Firm*—Pillsbury Winthrop Shaw Pittman LLP (57) ABSTRACT

A method of prefetching from a memory device includes determining a prefetch buffer hit rate (PBHR) and a memory bandwidth utilization (MBU) rate. Prefetches are inserted aggressively if the memory bandwidth utilization (MBU) rate is above a MBU threshold level and the prefetch buffer hit rate (PBHR) is above a PBHR threshold level. Prefetches are inserted conservatively if the memory bandwidth utilization (MBU) rate is above the MBU threshold level and the prefetch buffer hit rate (PBHR) is below the PBHR threshold level.

66 Claims, 6 Drawing Sheets

HIGH PERFORMANCE MEMORY DEVICE-STATE AWARE CHIPSET PREFETCHER

BACKGROUND

1. Technical Field

Embodiments of the present invention are directed to prefetching from a memory device, such as a dynamic random access memory (DRAM) device. More particularly, embodiments of the present invention are directed to apparatuses and methods of dynamically controlling prefetch injection that exploits the memory device state and workload stride to reduce page misses without introducing them.

2. Discussion of the Related Art

Figure 1:
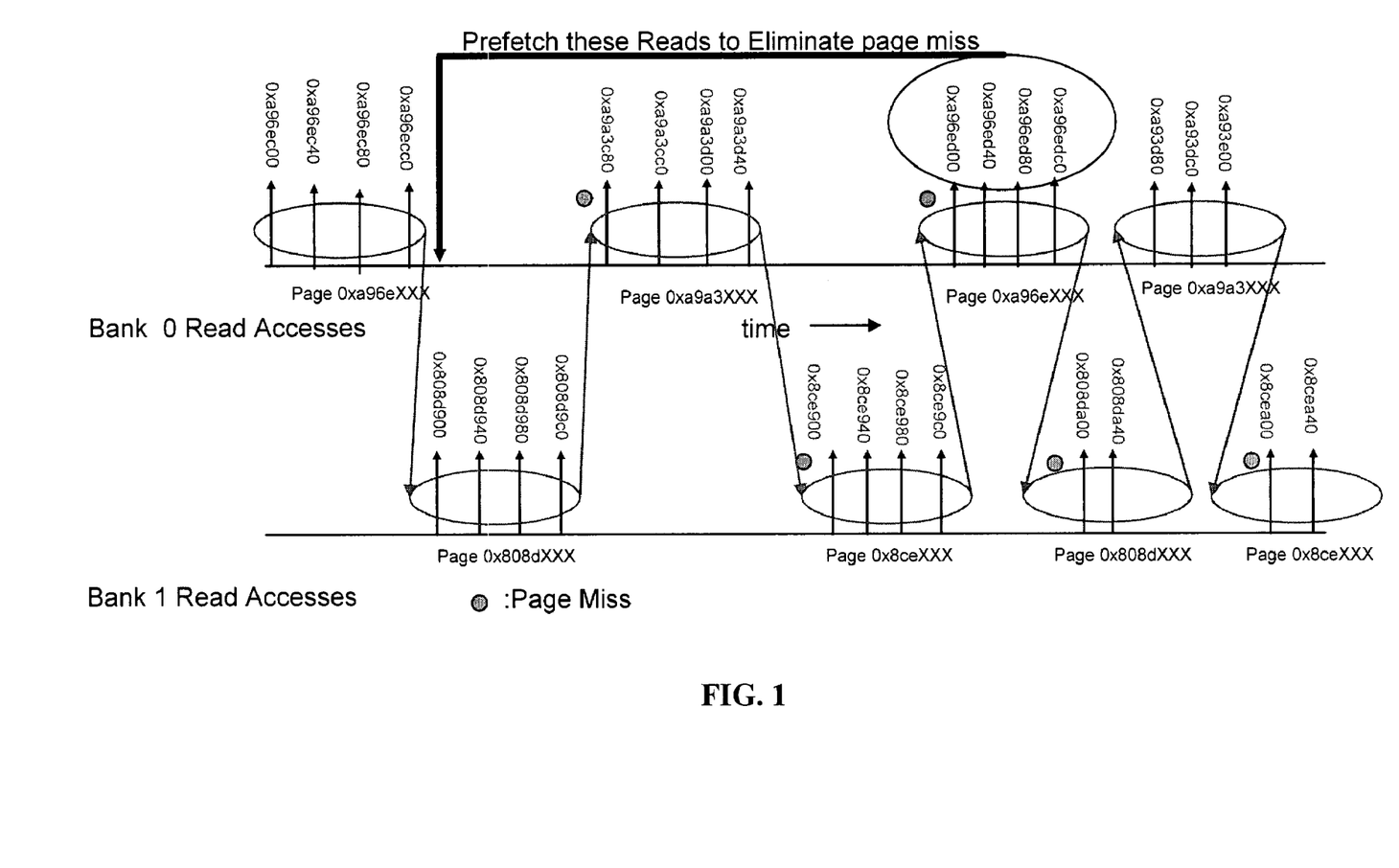
FIG. 1 illustrates sample access patterns conducted in a Standard Performance Evaluation Corporation (SPEC) floating point (SPECfp) "Swim" benchmark application.

DRAM page misses often result in poor performance of the overall memory system. FIG. 1 illustrates an example of access patterns conducted in the Standard Performance Evaluation Corporation (SPEC) floating point (SPECfp) "Swim" benchmark application. The SPECfp benchmark applications measure a processor's floating point performance and the central processing unit's (CPU's) interaction with main memory and cache. Bank 0 has streams 0xa96eXXX and 0xa9a3XXX (each being addresses of a 4K page). Bank 1 has streams 0x808dXXX and 0x8ceXXX (each being addresses of a 4K page). The addresses of both of these streams are one cache line apart (the cache line size being 64 bytes) and have a stride of +1. These streams have a predictable read transaction stride with a unit cache line stride. In both banks 0 and 1, prefetching future accesses in each stream would reduce page misses. The access patterns in FIG. 1 illustrate an example of a high bandwidth (BW), high page miss rate, with a regular stride application (such as Swim from SPECfp), where multiple streams collide with each other in the bank causing page misses. Prefetching in this scenario is beneficial if: (1) prefetching occurs when a page is already open so that no page misses are introduced from prefetching; and (2) prefetching occurs far enough ahead so that the page miss is entirely eliminated, as shown in the example of FIG. 1.

In the paper by W. Lin, S. Reinhardt, and D. Burger, "Reducing DRAM Latencies with an Integrated Memory Hierarchy Design", Proc., 7$^{th}$ International Symposium on High-Performance Computer Architecture, January 2001, a proposal was offered where prefetches are sent to a Level 2 (L2) cache. This scheme prefetches blocks that are spatially near the address of recent demand misses into the L2 cache only when the memory channel is idle and a DRAM page is opened. That is, a central processing unit (CPU) prefetcher attempts to prefetch a wide range of addresses around a demand miss when the memory channel (and system) is idle and a page is opened. Prefetching into a L2 cache may pollute the L2 cache with prefetched data and may give poor performance if the prefetched data is unused and the evicted line from the prefetch is used in the future.

Traditional PC platforms partitioning with a prefetcher in the CPU are not aware of memory system details (and specifically, the DRAM state). Additionally, the memory controller in the chipset is not aware of the current CPU state nor of the CPU prefetcher algorithm or state. Previous attempts to fix these problems have introduced a prefetcher in a chipset that employs a prefetcher with similar latency reduction aims as the CPU prefetcher, but is not as sophisticated because chipset price points do not permit as many gates for the prefetcher. Therefore, previous chipset prefetchers have not been as efficient because they do not take into account the DRAM state, and are constrained to use fewer gates due to the chipset price points.

Moreover, chipset prefetchers alleviate cache pollution problems with the CPU prefetcher to some extent by prefetching in a separate chipset prefetch buffer. A simplistic chipset prefetcher may inject prefetches on reads subject to certain conditions without considering how well the memory system reacted to the previously injected prefetches. These chipset prefetchers function basically as open-loop control systems. The prefetches are injected by the chipset prefetchers with the goal of reducing read latency. While such a technique provides performance gains for latency sensitive applications, a performance loss is observed for other scenarios.

Accordingly, what is needed is a chipset prefetch system (i.e., chipset prefetcher) and method that does not hurt the performance of applications that are not able to efficiently utilize prefetching, while maximizing the performance of applications that benefit from prefetch operations.

DETAILED DESCRIPTION

Figure 2:
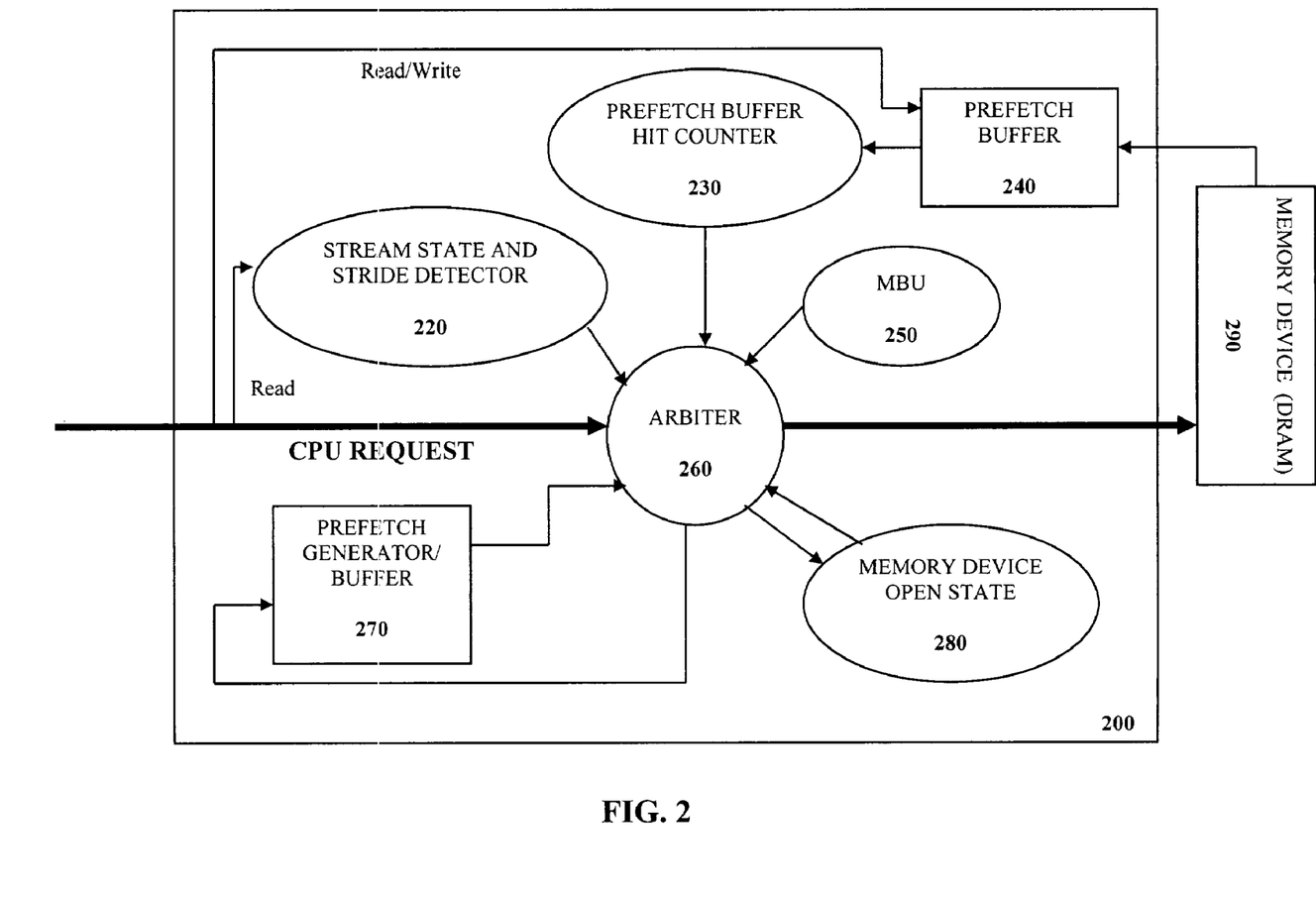
FIG. 2 illustrates a memory device-state aware prefetcher according to an embodiment of the present invention.

FIG. 2 illustrates a memory device-state aware prefetcher according to an embodiment of the present invention. The prefetcher 200 incorporates feedback heuristics to aggressively inject prefetches when it is beneficial, and switches to a conservative injection (or zero injection) when it is not beneficial. Accordingly, the prefetcher 200 is adapted to identify when prefetching is beneficial and deploy it aggressively to gain a performance advantage, and to identify when prefetching is not beneficial and deploy it conservatively so that performance is not compromised.

The following are useful for effective prefetching to take place: (1) identify the stream stride with a high degree of accuracy; (2) introduce prefeteches aggressively for those streams that have a stride established and have an open page; (3) monitor how well the prediction and prefetching is working by monitoring the "hit" rate for the prefeteches injected; and (4) throttle the future prefetches injected based on the prefetch hit rate and memory bandwidth utilization so that prefetches are not injected for applications where prefetching is not working well. Stride refers to cache line stride. For example, if there are read addresses a1, a2, and a3 such that a2−a1=a3−a2=cache line size, where a3>a2>a1, and a1 is the earliest access, then there is a stride of +1 for this address stream. In an alternative example, if the addresses are such that a2−a1=a3−a2=−cache line size, i.e., a1>a2>a3 and a1 is the earliest access, then there is a stride of −1 (or a negative unit stride, i.e., successive read access addresses are decreasing).

The prefetcher 200, according to one embodiment of the present invention, tracks one stream per logical DRAM page, and simultaneously tracks the state of multiple such streams. The prefetcher 200, preferably incorporated within a memory controller, receives demand requests from the CPU. CPU demand READ requests update the stream state tracked by the stream state and stride detector 220 for each READ stream. When a stride is detected for a stream by the stream state and stride detector 220, prefetches may be issued to that stream if certain conditions are met. For example, the detection of either a positive or negative unit (+ve and −ve) cache line stride enables prefetching, and typically, a large percentage of identifiable strides are unit strides. Any suitable stride detection algorithm may be utilized, though.

CPU READ and WRITE demands are checked against the prefetch buffer 240 that stores the prefetched data for a "hit" or match. If a WRITE hit occurs, then the entry in the prefetch buffer 240 corresponding to the hit is invalidated because the prefetch data is no longer up-to-date (since a write operation with new data is to be written to the memory device 290). In other words, the invalidation ensures that READs following that WRITE obtain data written by the WRITE demand request and not from a previous prefetch (because it is now "stale" data). However, if a READ hit occurs, then data is retrieved from the prefetch buffer 240, the entry is invalidated, and the data is returned from the prefetch buffer 240. Coherency between READ and WRITE demands and prefetches in the prefetch queue is maintained by utilizing, for example, a content-addressable memory (CAM) to check against entries in the prefetch queue, and then not forwarding READ demands/prefetches that match a READ demand and canceling prefetches that match a WRITE demand.

A prefetch buffer hit counter in module 230 is updated on READ hits to determine a prefetch buffer hit ratio (PBHR). The PBHR is expressed as a percentage of all prefetches issued in an interval that are "hit" by subsequent READs in the prefetch buffer 240 during that interval. Module 230 computes the PBHR over an interval that is intermediate between very short, where the estimate changes widely with recent requests, and very long, where the estimate is slow to respond to changes in behavior of the program executed by the CPU. The number of prefetches aggressively injected depends on the PBHR (discussed further below). A memory bandwidth utilization (MBU) module 250 is provided to monitor the memory bandwidth utilization (MBU) rate over a specified period of time. The MBU rate is expressed as a percentage of peak memory bandwidth utilized over a specified number of cycles. The MBU rate may include more than just an expression of CPU memory bandwidth usage, but may also include all memory system traffic, such as CPU demand, prefetch, integration graphics, input/output (I/O), etc. Prefetches are injected aggressively if the MBU rate is over a specified MBU threshold, and alternatively, prefetches may be injected only opportunistically when the memory system is idle. A memory device (e.g., DRAM) open state module 280 is provided to track which pages in the memory device 290 are open at any given instant.

Prefetch requests are only issued to open DRAM pages so that conflicts are not created. A memory device is organized into separate banks. Each bank is organized into a number of rows, and each row stores a "page" size data. In a given bank, only one of these device pages may be open at any given time. When a READ or WRITE access is made, an ACTIVATE command is issued to the memory device so that the desired row is selected and the page of data is read in, i.e., a page is "opened". To read a cache line of data from the open page, a column address strobe (CAS) command is issued so that the data can be read out onto the data bus. Successive reads to cache lines from the open page only require CAS commands to be issued to read the data (considered to be "page hits"). If, however, data needs to be read from the same bank, but from a different row (considered a conflict or "page miss"), the open page needs to be closed by issuing a PRECHARGE command to the memory device, followed by an ACTIVATE command to open a new page, and a CAS command to read the cache line from the new page.

An arbiter 260 receives input from each of the stream state and stride detector 220, the prefetch buffer hit counter 230, the memory bandwidth utilization (MBU) module 250, the memory device open state module 280, and a prefetch generator 270 to determine when and how many prefetches are to be injected. The arbiter 260 enters prefetch requests into the prefetch queue within the prefetch generator 270 and gives priority to pending prefetches over READ demand transactions so that they may be aggressively injected. The state of each stream is updated in the stream state and stride detector 220 when memory device pages are opened and closed (detected by the memory device open state module 280), or when a stream entry is replaced due to capacity. That is, the stream state and stride detector 220 is typically a limited size buffer that tracks a limited number of streams, e.g., 16 streams, but any suitable size buffer may be utilized. Similarly, the prefetch buffer 240 is also a limited size buffer, which may store, for example, 64 data entries, although any suitable size buffer may be utilized.

Figure 3:
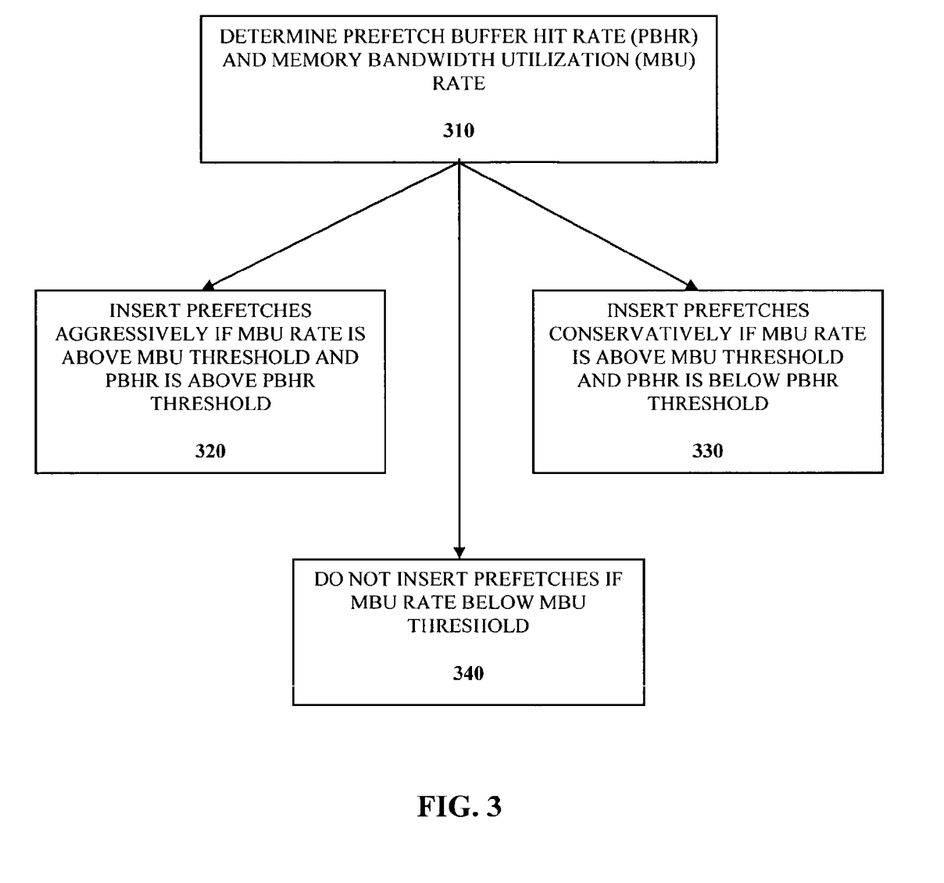
FIG. 3 illustrates a flow chart diagram of prefetching from a memory device according to an embodiment of the present invention.

FIG. 3 illustrates a flow chart diagram of prefetching from a memory device according to an embodiment of the present invention. The prefetch buffer hit rate (PBHR) and the memory bandwidth utilization (MBU) rate are determined 310 by the prefetcher 200. According to embodiments of the present invention, the arbiter 260 inserts 320 prefetches aggressively at a particular instant if the MBU rate is above an MBU threshold value and the PBHR is above a PBHR threshold value. The arbiter 260 inserts 330 prefeteches conservatively if the MBU rate is above the MBU threshold value and the PBHR is below the PBHR threshold value. The arbiter 260 does not insert 340 any prefetches if the MBU rate is below the MBU threshold value. These factors permit the prefetcher 200 to obtain feedback regarding previously injected prefetches, the workload bandwidth utilization, and dynamically control adaptation of the prefetcher 200 to these parameters. Accordingly, embodiments of the present invention provide a closed-loop adaptive feedback control system for prefetch throttling based on the prefetch buffer hit rate (PBHR) and the memory bandwidth utilization (MBU) rate.

The following illustrate one sample set of parameter values for a prefetcher 200 according to an embodiment of the present invention:

| | |
|---|---|
| Prefetch Buffer Size: | 64 lines |
| Prefetch Line Size: | 64 |
| Prefetch Type: | aggressive prefetch injection policy |
| Stream Replacement Policy: | round robin |
| Stream Address Tracking: | one stream per logical memory page size |
| Stream Prefetch Range: | limit to 4K |
| Flush inactive streams if no activity after 1,000 clocks of memory controller | |
| Number of Stream State entries: | 16 |

| | |
|---|---|
| -continued | |
| MBU Threshold Detection Interval: | 200 memory controller clocks |

The aggressive prefetch injection policy is as follows, the number of aggressive prefetches injected depends on the computed PBHR and may vary during run time at any particular instant:

8 prefetches when PBHR>75%
2 prefetches when 50%<PBHR<75%
1 prefetch when PBHR<50%

For a one-channel double-data rate (DDR) memory system, the above aggressive prefetch injection policy constraints are applied if the MBU rate is above 20% (that being the MBU threshold value); and below this MBU threshold value of 20%, no prefetches are injected.

For a two-channel DDR memory system, the MBU threshold value is 0% (i.e., the above aggressive prefetch injection policy constraints are always applied) because a two-channel DDR memory system has a higher "headroom" bandwidth and is able to accommodate more prefetches, as compared to a one-channel DDR memory system, to provide higher performance.

The above example is a tuned set of parameters that extracts the best performance from one and two channel DDR memory systems. However, any suitable variation of the parameter values based on the PBHR and MRU rate heuristics discussed above may be utilized for different system types and applications, and additional tuning may be required to obtain the best performance. For example, although the MBU Threshold Detection Interval above was set at 200 clocks of memory controller clocks, any range (e.g., 50 to 400 clocks), may be implemented without affecting the results quite differently. With respect to the PBHR, it is computed continuously for previous prefetches, and it is shown that the PBHR eventually settles down to a steady state value for an application after the initial transient state such that a long enough computational interval is required (e.g., 200 to 500 cycles).

Figure 4A:
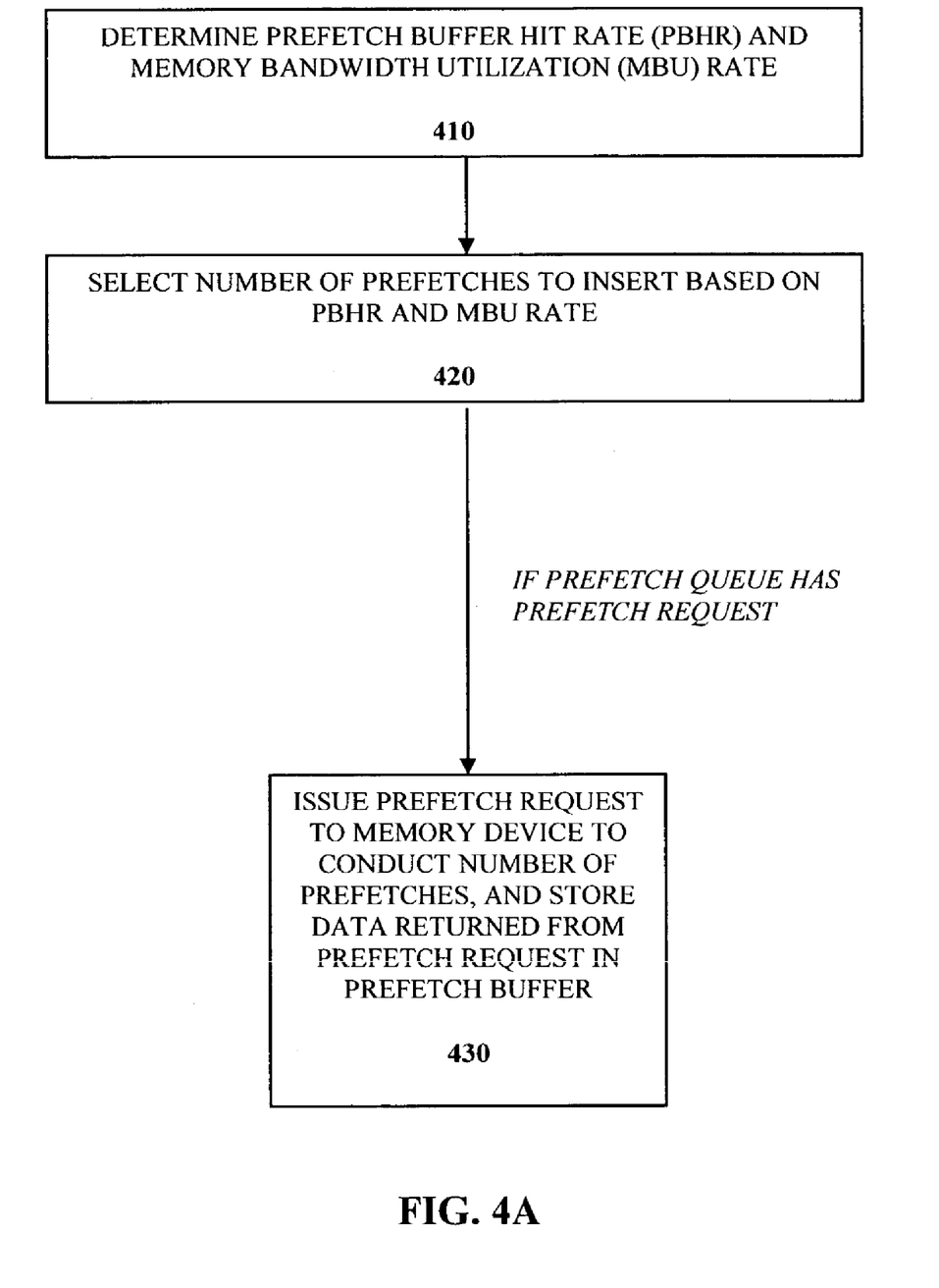
FIGS. 4A–4C illustrate flow chart diagrams of prefetching from a memory device according to embodiments of the present invention.
Figure 4B:
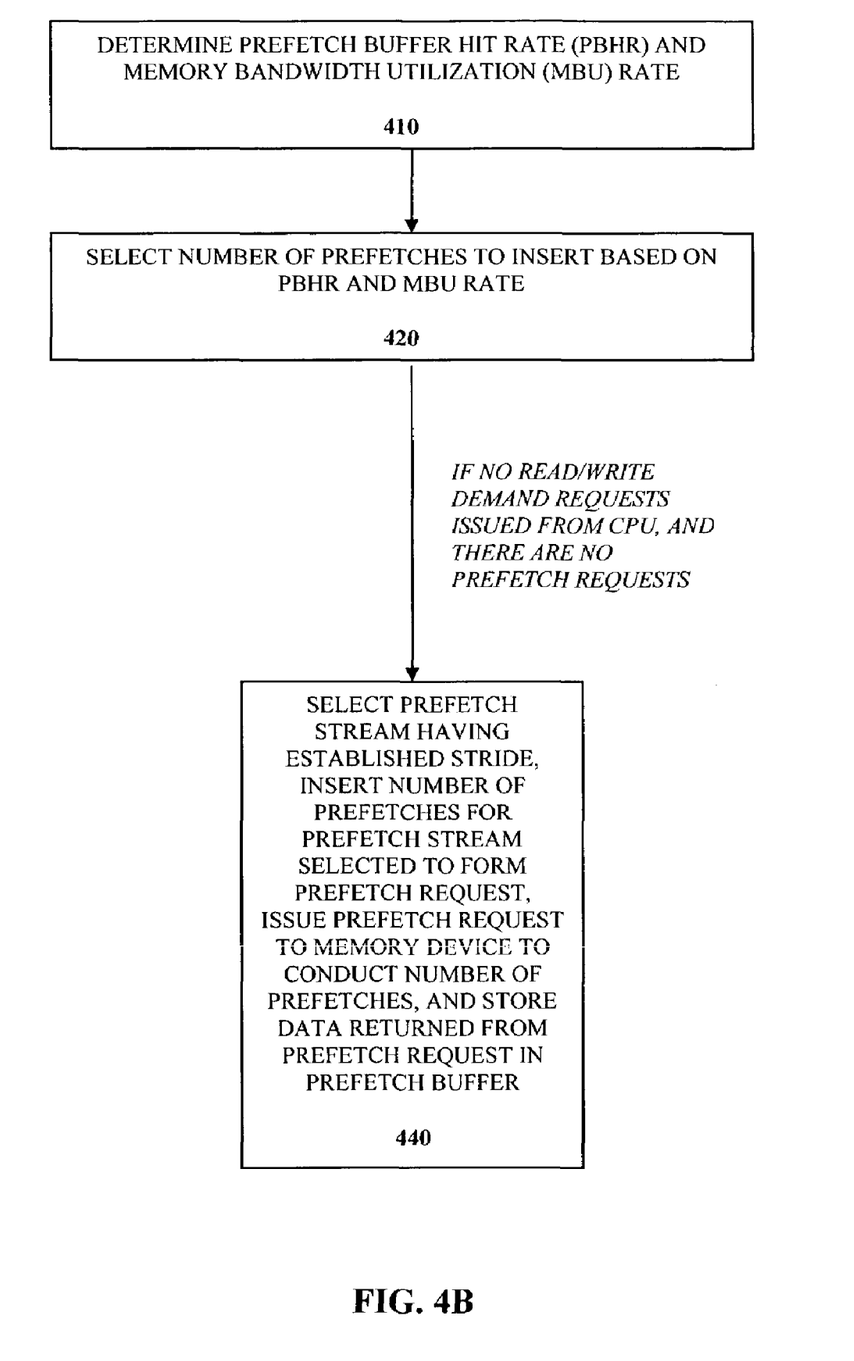
Figure 4C:
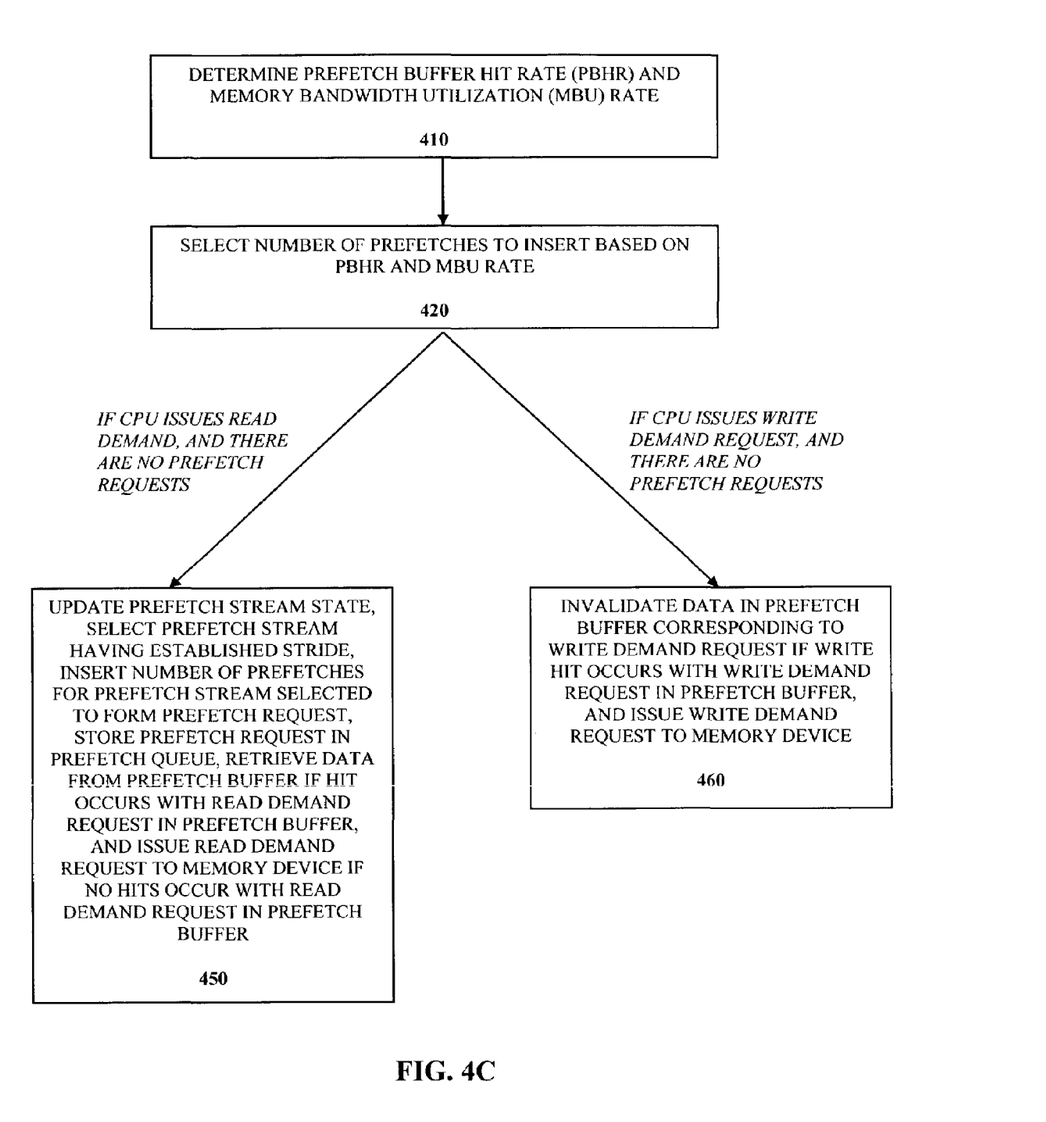

FIGS. 4A–4C illustrate flow chart diagrams of prefetching from a memory device according to embodiments of the present invention. The prefetcher 200 determines 410 the prefetch buffer hit rate (PBHR) and the memory bandwidth utilization (MBU) rate. Based on the PBHR and the MBU rate determined 410, a number of prefetches to be injected is selected 420 utilizing the prefetch injection policy constraints set forth for that particular system.

Referring to FIG. 4A, if the prefetch queue in the prefetch generator 270 has a prefetch request, then the prefetch request is issued 430 to the memory device 290 to conduct the number of prefetches selected 420 above, and the data returned from the prefetch request is stored in the prefetch buffer 240. In other words, the prefetcher 200 according to embodiments of the present invention prioritizes prefetches over any demand transactions (i.e., blocking all demand READ and WRITES until prefetches in the queue are emptied). When a prefetch is issued from the prefetch queue, an entry is reserved in the prefetch buffer. A subsequent demand READ matching an issued prefetch then waits until data is returned into the buffer (unless data is already there, in which case the data is retrieved and returned), and a demand WRITE invalidates the data in the prefetch buffer entry (but, depending on the implementation, that entry may still be maintained until completion of the read for the prefetch that was issued). When issuing new entries into the prefetch queue, it is made sure that there is no pending entry in the prefetch queue for the same access before inserting the entry into the prefetch queue.

Referring to FIG. 4B, if no READ or WRITE demand requests are issued from the CPU, and there are no prefetch requests in the prefetch queue, then a prefetch stream having an established stride is selected 440, the number of prefetches selected 420 above is inserted for that prefetch stream to form a prefetch request. With respect to the stream selection policy according to an embodiment of the present invention, if more than one stream is eligible (i.e., having an established stride and an open bank), a round-robin policy may be implemented, as compared to a least-recently used (LRU) policy, for example. However, any suitable stream selection policy may be implemented according to embodiments of the present invention. The prefetch request is issued to the memory device 290 to conduct the number of prefetches selected 420, and the data returned from the prefetch request is stored in the prefetch buffer 240.

Referring to FIG. 4C, if the CPU issues a READ demand, and there are no prefetch requests in the prefetch queue, then the prefetch stream state is updated 450 in the stream state and stride detector 220, and a prefetch stream having an established stride is selected. Entries in the prefetch buffer are reserved for entries in the prefetch queue or the CAM to check against the entries in the prefetch queue. The number of prefetches selected 420 above is inserted for the selected prefetch stream to form a prefetch request. The prefetch request is stored in the prefetch queue within the prefetch generator 270. Data is retrieved from the prefetch buffer 240 if a "hit" occurs with the READ demand request in the prefetch buffer 240. The READ demand request is issued to the memory device 290 if no hits occur with the READ demand request in the prefetch buffer 240.

On the other hand, if the CPU issues a WRITE demand request, and there are no prefetch requests in the prefetch queue, the data in the prefetch buffer 240 corresponding to the WRITE demand request is invalidated if a WRITE "hit" occurs with the WRITE demand request in the prefetch buffer 240. The WRITE demand request is ultimately issued to memory device 290 whether or not a WRITE hit occurs.

Unlike the scheme proposed by W. Lin, S. Reinhardt, and D. Burger discussed above, embodiments of the present invention inject prefetches aggressively when possible, taking priority over demand requests to eliminate page misses, whereas Lin et al. propose to prefetch only when the memory system is idle. Moreover, embodiments of the present invention inject prefetches on unit positive or unit negative cache line stride detection in an open page on multiple streams, whereas Lin et al. propose to inject prefetches on a cache read miss in a scheduled region in an open page. Finally, embodiments of the present invention utilize prefetch throttling explicitly based on two heuristics involving the prefetch buffer hit rate (PBHR) and the memory bandwidth utilization (MBU) rate, respectively, whereas Lin et al. propose to issue prefetches only when the memory system is idle.

The adaptive chipset prefetcher 200 according to embodiments of the present invention provides at least a 19–38% performance gain for applications with high bandwidth, high page miss rate, and a predictable read transaction stride by efficiently predicting future read accesses utilizing the memory device-state (e.g., DRAM-state) information, and adjusting prefetch injection based on how well the prefetches injected previously are being used by subsequent reads.

As mentioned above, high bandwidth, high page miss rate, and well-striding applications (i.e., an application that emits read access addresses with a stride for a long string of accesses) gain significantly, e.g., SPECfp Swim obtains a 38% performance gain with prefetching according to embodiments of the present invention. These applications show significant page miss reductions, as well as greater than a 90% PBHR. There is a marginal performance gain of 1% for SPECint (a SPEC benchmark for integer computation) and no performance loss in the case of other benchmark applications.

The adaptive chipset prefetcher 200 according to embodiments of the present invention does not hurt performance of benchmarks that are unable to utilize prefetching well by throttling prefetch injection in those instances. Therefore, embodiments of the present invention eliminate page misses by prefetching aggressively when it works, adapting to the workload stride and memory device-state, and operating as an adaptive closed-loop feedback control system without compromising the performance in cases where prefetching is not beneficial. Although embodiments of the present invention are directed to a chipset prefetcher, alternative embodiments may be implemented in, for example, an integrated memory controller (i.e., where the memory controller is on a CPU chip), and prefetch into a separate prefetch buffer between the CPU and in the integrated memory controller.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A method of prefetching from a memory device, comprising:
   determining a prefetch buffer hit rate (PBHR) and a memory bandwidth utilization (MBU) rate;
   inserting prefetches to open pages before completing demand transactions if the memory bandwidth utilization (MBU) rate is above a MBU threshold level and the prefetch buffer hit rate (PBHR) is above a PBHR threshold level; and
   inserting prefetches to open pages after completing the demand transactions if the memory bandwidth utilization (MBU) rate is above the MBU threshold level and the prefetch buffer hit rate (PBHR) is below the PBHR threshold level.

2. The method according to claim 1, further including inserting zero prefetches if the memory bandwidth utilization (MBU) rate is below the MBU threshold level.

3. The method according to claim 1, further including computing the prefetch buffer hit rate (PBHR) over a time interval.

4. The method according to claim 1, further including computing the memory bandwidth utilization (MBU) rate over a time interval.

5. The method according to claim 1, wherein the method is performed by a chipset prefetcher.

6. A method of prefetching from a memory device, comprising:
   determining a prefetch buffer hit rate (PBHR) and a memory bandwidth utilization (MBU) rate;
   selecting a number of prefetches to insert based on the prefetch buffer hit rate (PBHR) and the memory bandwidth utilization (MBU) rate; and
   issuing a prefetch request to the memory device to conduct the number of prefetches to open pages if a prefetch queue has the prefetch request, and storing data returned from the prefetch request in a prefetch buffer.

7. The method according to claim 6, wherein the number of prefetches is a first value if the prefetch buffer hit rate (PBHR) is above a PBHR threshold level and the memory bandwidth utilization (MBU) rate is above a MBU threshold level.

8. The method according to claim 7, wherein the number of prefetches is a second value if the prefetch buffer hit rate (PBHR) is below the PBHR threshold level and the memory bandwidth utilization (MBU) rate is above the MBU threshold level, wherein the second value is less than the first value.

9. The method according to claim 6, wherein the number of prefetches is zero if the memory bandwidth utilization (MBU) rate is below a MBU threshold level.

10. The method according to claim 6, further including computing the prefetch buffer hit rate (PBHR) over a time interval.

11. The method according to claim 6, further including computing the memory bandwidth utilization (MBU) rate over a time interval.

12. The method according to claim 6, wherein the method is performed by a chipset prefetcher.

13. A method of prefetching from a memory device, comprising:
    determining a prefetch buffer hit rate (PBHR) and a memory bandwidth utilization (MBU) rate;
    selecting a number of prefetches to insert based on the prefetch buffer hit rate (PBHR) and the memory bandwidth utilization (MBU) rate; and
    if no read or write demand requests are issued from a central processing unit (CPU) and there are no prefetch requests, selecting a prefetch stream having an established stride, inserting the number of prefetches for the prefetch stream selected to form a prefetch request, issuing the prefetch request to the memory device to conduct the number of prefetches to open pages, and storing data returned from the prefetch request in the prefetch buffer.

14. The method according to claim 13, wherein the number of prefetches is a first value if the prefetch buffer hit rate (PBHR) is above a PBHR threshold level and the memory bandwidth utilization (MBU) rate is above a MBU threshold level.

15. The method according to claim 14, wherein the number of prefetches is a second value if the prefetch buffer hit rate (PBHR) is below the PBHR threshold level and the memory bandwidth utilization (MBU) rate is above the MBU threshold level, wherein the second value is less than the first value.

16. The method according to claim 13, wherein the number of prefetches is zero if the memory bandwidth utilization (MBU) rate is below a MBU threshold level.

17. The method according to claim 13, further including storing the prefetch request in a prefetch queue after inserting the number of prefetches for the prefetch stream selected.

18. The method according to claim 13, further including computing the prefetch buffer hit rate (PBHR) over a time interval.

19. The method according to claim 13, further including computing the memory bandwidth utilization (MBU) rate over a time interval.

20. The method according to claim 13, wherein the method is performed by a chipset prefetcher.

21. A method of prefetching from a memory device, comprising:
determining a prefetch buffer hit rate (PBHR) and a memory bandwidth utilization (MBU) rate;
selecting a number of prefetches to insert based on the prefetch buffer hit rate (PBHR) and the memory bandwidth utilization (MBU) rate;
if the CPU issues a read demand request and there are no prefetch requests, updating a prefetch stream state, selecting a prefetch stream having an established stride, inserting the number of prefetches for the prefetch stream selected to form a prefetch request, storing the prefetch request in a prefetch queue, retrieving data from the prefetch buffer if a hit occurs with the read demand request in the prefetch buffer, and issuing the read demand request to the memory device if no hits occur with the read demand request in the prefetch buffer; and
if the CPU issues a write demand request and there are no prefetch requests, invalidating data in the prefetch buffer corresponding to the write demand request if a write hit occurs with the write demand request in the prefetch buffer, and issuing the write demand request to the memory device.

22. The method according to claim 21, wherein the number of prefetches is a first value if the prefetch buffer hit rate (PBHR) is above a PBHR threshold level and the memory bandwidth utilization (MBU) rate is above a MBU threshold level.

23. The method according to claim 22, wherein the number of prefetches is a second value if the prefetch buffer hit rate (PBHR) is below the PBHR threshold level and the memory bandwidth utilization (MBU) rate is above the MBU threshold level, wherein the second value is less than the first value.

24. The method according to claim 21, wherein the number of prefetches is zero if the memory bandwidth utilization (MBU) rate is below a MBU threshold level.

25. The method according to claim 21, further including checking a content-addressable memory (CAM) against entries in the prefetch queue to determine if the hit or the write hit occurred.

26. The method according to claim 21, further including computing the prefetch buffer hit rate (PBHR) over a time interval.

27. The method according to claim 21, further including computing the memory bandwidth utilization (MBU) rate over a time interval.

28. The method according to claim 21, wherein the method is performed by a chipset prefetcher.

29. A method of prefetching from a memory device, comprising:
determining a prefetch buffer hit rate (PBHR) and a memory bandwidth utilization (MBU) rate;
selecting a number of prefetches to insert based on the prefetch buffer hit rate (PBHR) and the memory bandwidth utilization (MBU) rate;
issuing a prefetch request to the memory device to conduct the number of prefetches to open pages if a prefetch queue has the prefetch request, and storing data returned from the prefetch request in a prefetch buffer;
if no read or write demand requests are issued from a central processing unit (CPU) and there are no prefetch requests, selecting a prefetch stream having an established stride, inserting the number of prefetches for the prefetch stream selected to form the prefetch request, issuing the prefetch request to the memory device to conduct the number of prefetches, and storing data returned from the prefetch request in the prefetch buffer;
if the CPU issues a read demand request and there are no prefetch requests, updating a prefetch stream state, selecting the prefetch stream having the established stride, inserting the number of prefetches for the prefetch stream selected to form the prefetch request, storing the prefetch request in the prefetch queue, retrieving data from the prefetch buffer if a hit occurs with the read demand request in the prefetch buffer, and issuing the read demand request to the memory device if no hits occur with the read demand request in the prefetch buffer; and
if the CPU issues a write demand request and there are no prefetch requests, invalidating data in the prefetch buffer corresponding to the write demand request if a write hit occurs with the write demand request in the prefetch buffer, and issuing the write demand request to the memory device.

30. The method according to claim 29, wherein the number of prefetches is a first value if the prefetch buffer hit rate (PBHR) is above a PBHR threshold level and the memory bandwidth utilization (MBU) rate is above a MBU threshold level.

31. The method according to claim 30, wherein the number of prefetches is a second value if the prefetch buffer hit rate (PBHR) is below the PBHR threshold level and the memory bandwidth utilization (MBU) rate is above the MBU threshold level, wherein the second value is less than the first value.

32. The method according to claim 29, wherein the number of prefetches is zero if the memory bandwidth utilization (MBU) rate is below a MBU threshold level.

33. The method according to claim 29, further including computing the prefetch buffer hit rate (PBHR) over a time interval.

34. The method according to claim 29, further including computing the memory bandwidth utilization (MBU) rate over a time interval.

35. The method according to claim 29, wherein the method is performed by a chipset prefetcher.

36. A chipset prefetcher in communication with a memory device, comprising:
a stream state and detection circuit to receive a read demand request, to detect a state and a stride of a stream of the read demand request, and to store the stream;
a memory device page status circuit to determine which page in each bank of the memory device are open;
a memory bandwidth utilization (MBU) circuit to determine a memory bandwidth utilization (MBU) rate;
a prefetch buffer circuit to receive read and write demand requests, and to store data returned from prefetch operations from the memory device;
a prefetch buffer hit counter circuit in communication with the prefetch buffer circuit to determine a prefetch buffer hit rate (PBHR);

a prefetch generator circuit to generate prefetch requests; and an arbiter circuit to receive the read and write demand requests, to insert prefetches to open pages before processing the read and write demand requests if the memory bandwidth utilization (MBU) rate is above a MBU threshold level and the prefetch buffer hit rate (PBHR) is above a PBHR threshold level, and to insert prefetches to open pages after processing the read and write demand requests if the memory bandwidth utilization (MBU) rate is above the MBU threshold level and the prefetch buffer hit rate (PBHR) is below the PBHR threshold level.

37. The chipset prefetcher according to claim 36, wherein the prefetch generator circuit includes a prefetch queue to store the prefetch requests.

38. The chipset prefetcher according to claim 36, wherein the stream state and detection circuit is in electrical communication with a central processing unit (CPU) to receive stride data from the CPU.

39. The chipset prefetcher according to claim 36, wherein the arbiter circuit is adapted to insert zero prefetches if the memory bandwidth utilization (MBU) rate is below the MBU threshold level.

40. The chipset prefetcher according to claim 36, wherein the chipset prefetcher is coupled to a memory controller.

41. The chipset prefetcher according to claim 36, wherein the prefetch buffer hit counter circuit computes the prefetch buffer hit rate (PBHR) over a time interval.

42. The chipset prefetcher according to claim 36, wherein the memory bandwidth utilization (MBU) circuit computes the memory bandwidth utilization (MBU) rate over a time interval.

43. A memory system, comprising:
a memory device; and
a memory controller in communication with the memory device, the memory controller having
a circuit to determine a prefetch buffer hit rate (PBHR) and a memory bandwidth utilization (MBU) rate;
a circuit to insert prefetches to open pages before completing demand transactions if the memory bandwidth utilization (MBU) rate is above a MBU threshold level and the prefetch buffer hit rate (PBHR) is above a PBHR threshold level; and
a circuit to insert prefetches to open pages after completing the demand transactions if the memory bandwidth utilization (MBU) rate is above the MBU threshold level and the prefetch buffer hit rate (PBHR) is below the PBHR threshold level.

44. The memory system according to claim 43, wherein the memory controller further includes a circuit to insert zero prefetches if the memory bandwidth utilization (MBU) rate is below the MBU threshold level.

45. The memory system according to claim 43, wherein the memory controller further includes a circuit to compute the prefetch buffer hit rate (PBHR) over a time interval.

46. The memory system according to claim 43, wherein the memory controller further includes a circuit to compute the memory bandwidth utilization (MBU) rate over a time interval.

47. A memory controller in communication with a memory device, comprising:
a prefetch buffer hit counter circuit to determine a prefetch buffer hit rate (PBHR);
a memory bandwidth utilization (MBU) circuit to determine a memory bandwidth utilization (MBU) rate; and an arbiter circuit to select a number of prefetches to insert based on the prefetch buffer hit rate (PBHR) and the memory bandwidth utilization (MBU) rate, to issue a prefetch request to the memory device to conduct the number of prefetches to open pages if a prefetch queue has the prefetch request, and to store data returned from the prefetch request in a prefetch buffer.

48. The memory controller according to claim 47, wherein the number of prefetches is a first value if the prefetch buffer hit rate (PBHR) is above a PBHR threshold level and the memory bandwidth utilization (MBU) rate is above a MBU threshold level.

49. The memory controller according to claim 48, wherein the number of prefetches is a second value if the prefetch buffer hit rate (PBHR) is below the PBHR threshold level and the memory bandwidth utilization (MBU) rate is above the MBU threshold level, wherein the second value is less than the first value.

50. The memory controller according to claim 47, wherein the number of prefetches is zero if the memory bandwidth utilization (MBU) rate is below a MBU threshold level.

51. The memory controller according to claim 47, further including a circuit to compute the prefetch buffer hit rate (PBHR) over a time interval.

52. The memory controller according to claim 47, further including a circuit to compute the memory bandwidth utilization (MBU) rate over a time interval.

53. A memory controller in communication with a memory device, comprising:
a prefetch buffer hit counter circuit to determine a prefetch buffer hit rate (PBHR);
a memory bandwidth utilization (MBU) circuit to determine a memory bandwidth utilization (MBU) rate; and
an arbiter circuit to select a prefetch stream having an established stride, to insert a number of prefetches for the prefetch stream selected to form a prefetch request, to issue the prefetch request to the memory device to conduct the number of prefetches to open pages, and to store data returned from the prefetch request in a prefetch buffer if no read or write demand requests are issued from a central processing unit (CPU) and there are no pending prefetch requests.

54. The memory controller according to claim 53, wherein the number of prefetches is a first value if the prefetch buffer hit rate (PBHR) is above a PBHR threshold level and the memory bandwidth utilization (MBU) rate is above a MBU threshold level.

55. The memory controller according to claim 54, wherein the number of prefetches is a second value if the prefetch buffer hit rate (PBHR) is below the PBHR threshold level and the memory bandwidth utilization (MBU) rate is above the MBU threshold level, wherein the second value is less than the first value.

56. The memory controller according to claim 53, wherein the number of prefetches is zero if the memory bandwidth utilization (MBU) rate is below a MBU threshold level.

57. The memory controller according to claim 53, further including a circuit to store the prefetch request in a prefetch queue after inserting the number of pre fetches for the prefetch stream selected.

58. The memory controller according to claim 53, further including a circuit to compute the prefetch buffer hit rate (PBHR) over a time interval.

59. The memory controller according to claim 53, further including a circuit to compute the memory bandwidth utilization (MBU) rate over a time interval.

60. A memory controller in communication with a memory device, comprising:
- a prefetch buffer hit counter circuit to determine a prefetch buffer hit rate (PBHR);
- a memory bandwidth utilization (MBU) circuit to determine a memory bandwidth utilization (MBU) rate; and
- an arbiter circuit to select a number of prefetches to insert based on the prefetch buffer hit rate (PBHR) and the memory bandwidth utilization (MBU) rate,
- if the CPU issues a read demand request and there are no prefetch requests, to update a prefetch stream state, to select a prefetch stream having an established stride, to insert the number of prefetches for the prefetch stream selected to form a prefetch request, to store the prefetch request in a pre fetch queue, to retrieve data from a prefetch buffer if a hit occurs with the read demand request in the prefetch buffer, and to issue the read demand request to the memory device if no hits occur with the read demand request in the prefetch buffer, and
- if the CPU issues a write demand request and there are no prefetch requests, to invalidate data in the pre fetch buffer corresponding to the write demand request if a write hit occurs with the write demand request in the prefetch buffer, and to issue the write demand request to the memory device.

61. The memory controller according to claim 60, wherein the number of prefetches is a first value if the prefetch buffer hit rate (PBHR) is above a PBHR threshold level and the memory bandwidth utilization (MBU) rate is above a MBU threshold level.

62. The memory controller according to claim 61, wherein the number of prefetches is a second value if the prefetch buffer hit rate (PBHR) is below the PBHR threshold level and the memory bandwidth utilization (MBU) rate is above the MBU threshold level, wherein the second value is less than the first value.

63. The memory controller according to claim 60, wherein the number of prefetches is zero if the memory bandwidth utilization (MBU) rate is below a MBU threshold level.

64. The memory controller according to claim 60, further including a circuit to check a content-addressable memory (CAM) against entries in the prefetch queue to determine if the hit or the write hit occurred.

65. The memory controller according to claim 60, further including a circuit to compute the prefetch buffer hit rate (PBHR) over a time interval.

66. The memory controller according to claim 60, further including a circuit to compute the memory bandwidth utilization (MBU) rate over a time interval.

* * * * *